United States Patent Office 2,819,754
Patented Jan. 14, 1958

---

2,819,754
SURFACE COVERINGS

David A. Feigley, Jr., Lancaster Township, Lancaster County, Pa., assignor to Armstrong Cork Company, Lancaster, Pa., a corporation of Pennsylvania No Drawing. Application April 18, 1955
Serial No. 502,215

37 Claims. (Cl. 154—25)

This invention relates generally to surface coverings, and more particularly to surface coverings comprising a decorative wear-resistant layer of a siccative oil composition and a supporting layer. More particularly, the invention relates to linoleum. Still more particularly, the invention relates to the production of linoleum, particularly during the stoving or curing cycle.

One of the most widely used surface coverings is linoleum. Linoleum may be produced by calendering linoleum compositions to a backing of burlap or saturated felt, such as asphalt-, resin-, or rubber-saturated felt. The linoleum composition generally comprises a linoleum cement and fillers and pigments. Linoleum cements have been made for a number of years from a drying oil and a resin by various methods which result in the production of a siccative oil-resin gel by oxidizing and polymerizing drying oil, generally in the presence of the resinous material. As used herein, the term "siccative oil" or its equivalent is intended to include drying oils and semi-drying oils. Ordinarily, linoleum cements comprise about 65% to 85% drying oil and about 15% to 35% resin. For the most part, linoleum cements have been manufactured from a resin such as rosin and a siccative oil such as a drying oil, for example linseed oil, and a semidrying oil, for example soya bean oil. In recent years, other materials have been used in place of a portion or all of the drying oil component of the linoleum cement. Tall oil or tall oil esters as either partially or completely esterified tall oils have been used to replace a portion or all of the usual drying oil components of linoleum cement. Such drying oil compositions may be admixed with, in addition to the rosin described above, such other resins, as for example copals, kauri gum, Congo gum, other naturally occurring resins, and synthetic resins, such as urea-formaldehyde resins, phenol-formaldehyde resins, resinous petroleum derivatives, such as still residues from refining of petroleum fractions and the like, and any other of the drying or semidrying oils commonly employed in the manufacture of such compositions.

To form the linoleum compositions, the linoleum cement is compounded with fillers, such as cork, wood flour, and the like, and various pigments. A typical linoleum composition is as follows:

| | Parts by weight |
|---|---|
| Wood flour | 73 |
| Whiting | 117 |
| Cement | 112 |

Linoleum itself may be produced by calendering linoleum composition, prepared as described above, to a backing. The calendered product must then be cured or stoved to attain the resilient hard surface material which is applied primarily to floors but which also finds application to walls, sink tops, counter tops, and the like.

The curing or stoving cycle in linoleum production is generally carried out in ventilated stoves at a temperature of about 195° F. for a period of time necessary to produce the requisite physical properties in linoleum; this usually requires about 14 days.

For an extended period of time of about 40 years, a deleterious phenomenon has been noted as occurring during the stoving or curing cycle. The phenomenon has been called "stove staining," and has occurred most noticeably on those linoleums which are either entirely light-colored or which possess light-colored areas in a pattern or design. Stove staining particularly occurs when the linoleum has been festooned in multiple layers in the stove. Festooning means simply that the linoleum is suspended in loops one inside the other in order that advantage may be taken of the complete capacity of the stove. The stove staining of light-colored linoleum has rendered unusable large quantities of linoleum; the ugly brownish stains completely destroy the visual appeal of the linoleum. Although the stain may be bleached out in the sunlight, this is an expensive process.

Stove staining occurs to a relatively minor extent when burlap is used as the supporting layer or backing for the linoleum composition. Stove staining occurs to a major degree when asphalt-saturated felt is used as a supporting layer. For this reason, it has long been supposed that the staining was caused by the volatile fractions of the asphalt released during the curing or stoving period. Although much research has been carried out over the last two decades in an attempt to overcome the stove staining problem, no one has yet met with success.

It is, therefore, the primary object of the present invention to present a method for eliminating stove staining. It is a further object to present a surface covering so treated as to render stove staining negligible. It is still a further object of the present invention to present a process of treating a felt-supporting layer for use in linoleum manufacture, which felt layer is incapable of staining a light-colored linoleum composition during the curing cycle.

These objects have been achieved in a surprisingly simple and strikingly straightforward and effective manner. In the method of making a surface covering comprising a decorative layer of siccative oil composition and a supporting layer containing proteinaceous material, the invention contemplates the elimination of stove staining by the treatment of the proteinaceous material with a tanning agent.

The present invention results from the unobvious and completely unexpected discovery that stove staining of linoleum compositions is due to the presence of proteinaceous material in the supporting layer of the surface covering. Despite experimental work conducted throughout the years in the past and despite the best guess of workers highly skilled in the linoleum art, stove staining has been found to have no connection with felt saturants, but instead results from proteinaceous material in the felt itself. This proteinaceous material arises from the incorporation of wool or other protein-containing fibers in rags and other fibrous sources from which felt is made. The present work has uncovered the fact that the felt, such as flooring felt, gray felt, and other similar materials, contains on an average about 5% wool or other proteinaceous material as a contaminant; this 5% content is surprisingly consistent in the felts currently used.

The precise mechanism of stove staining is still not clear. The experimental work leading to the present invention has, however, proved conclusively that proteinaceous material ultimately causes the staining. It is postulated that under the conditions of heat and moisture existing during the curing or stoving cycle in linoleum manufacture, nitrogenous compounds such as ammonia or low molecular weight amines, or both, are produced by degradation of the protein molecule. It is postulated that the degradation involves the terminal amino groups on the protein molecule. The chemical bond binding the terminal amino groups is more ionic than covalent in nature, and thus more readily subject to cleavage. Under the conditions that exist in the linoleum stove, then, these nitrogenous compounds are liberated from the protein molecule. These nitrogenous compounds contact the linoleum composition and form a chromophoric compound which causes the unsightly stain. This hypothesis is strengthened by the fact that it is possible to distill ammonia from proteinaceous material under stoving conditions, and further by the fact that the agent which causes the formation of the chromophore in the composition is volatile. In addition, chemical analysis of badly stained samples of linoleum mix have shown significantly higher nitrogen contents than unstained samples. As mentioned above, the exact mechanism is not known with any degree of certainty, and there is no intent that the present invention shall be contingent on the hypothesized mechanism. It is known, however, that the stove staining reaction, whatever it may be, is completely or substantially eliminated by following the teachings of the present invention.

To eliminate stove staining, the proteinaceous material in the supporting layer must be treated with a tanning agent. Tanning agents are widely used in connection with the conversion of the hides or skins of animals into leather. The same agents useful for such conversion are useful in eliminating the stove staining mechanism by the present invention. These tanning agents may generally be placed in at least six groups, as follows:

(1) Aldehydes, including aldoses
(2) Tanning metal salts
(3) Polybasic acids
(4) Polysulfonic acids
(5) Natural tannins
(6) Syntans According to the present invention, then, the proteinaceous material occurring in the supporting layer of a surface covering must be treated with tanning compounds as exemplified by one or more of the above described six groups. These groups are not exclusive however. Certain ketones, such as ketene and dihydroxy acetone, also act as tanning agents, as do ketoses, for example, fructose. The selection of which tanning agent or agents to be used will depend, in large measure, upon the cost of the agent at the time, as well as the ease of application of the agent. Among the aldehydes, there may be used such compounds as formaldehyde in the form of formalin, paraformaldehyde, glyoxal, or the reducing sugars known as aldoses. In fact, it is a preferred embodiment of the present invention to treat the proteinaceous material in felt with a reducing sugar such as dextrose. Ketoses, as for example, fructose, may also be used. Among the salts of metals, there are preferred such tanning metal salts as aluminum sulfate, chromium potassium sulfate, cobalt sulfate, and nickel sulfate. Among the organic polybasic acids, such compounds as oxalic, citric, succinic, maleic, and phthalic are preferred. Among the polysulfonic acids, sulfonated polystyrene resins, in particular, the ion exchange resin designated as IR-120, serve as excellent tanning agents. Natural tannins are those natural products containing tannic acid, and these materials may be used in any of their known modifications. Among the syntans, those of particular note are those designated as Leukanol HPS, a naphthalenic syntan, and Leukanol R and Orotan TV, both aromatic hydroxy syntans. All of these are sold by Rohm and Haas Company.

The selected tanning agent may be applied to the proteinaceous material in any convenient manner. Since most tanning agents are water-soluble, it is usually most convenient to apply the tanning agent to the proteinaceous material from a water solution. If the tanning agent is volatile and liquid, as in the case of glyoxal, a water solution may be prepared in the same manner as if the tanning agent were a water-soluble solid.

The actual application of the water solution to the proteinaceous material may take place in any of several ways. The fibers may thus be treated before the felt is formed on the wire or cylinder or similar device. This may readily be accomplished by suspending the fibers in the requisite solution of the tanning agent and adjusting the pH or raising the temperature until the tanning agent has reacted with the protein sufficiently to stabilize the protein against degradation into volatile nitrogenous compounds under stoving conditions. This serves to define an end point of the tanning reaction as utilized in the present invention. Where the fibers are being treated with solutions of salts of tanning metals, it is preferred that the concentration of the salt be in the range of about 0.5% and that the temperature be elevated to about 60°–80° C. for a period of time of from about 20–60 minutes. Other tanning agents should have similar or increased concentrations in the aqueous solution, depending on their strengths as tanning agents. Generally speaking, the retained amount of tanning agent should not be below about 5% by weight of total fiber content, although lower amounts give improved results over untreated felt. Once the tanning reaction has gone substantially to completion, the felt may be formed from the tanned fibers in the usual manner. The felt may subsequently be washed and dried and otherwise treated as desired and will still not cause any staining of the linoleum composition during the stoving portion of the linoleum-making cycle.

Alternatively to causing the tanning reaction to take place before the felt is formed, the felt may be formed directly from the tanning agent-containing solution. It is necessary only that the tanning agent-containing solution retained on the fibers during the felt-forming process be not removed therefrom. On drying, it can readily be seen that the selected tanning agent will remain on the fibers when the tanning agent is a solid. When the tanning agent is a volatile liquid, it will be found that the tanning reaction will usually take place to a sufficient extent during the normal drying of the felt at the elevated temperatures normally used. This felt may then be utilized as a supporting layer in the usual linoleum operation, and it will be found that no staining results therefrom.

Another method of treating the proteinaceous material, however, is to treat the felt after it has been formed and dried with a solution of the selected tanning agent. If this method is used, an extremely convenient system offers itself. The normal pick-up of water of such a felt amounts to about 200% based on the dry weight of the fibers. Therefore, if the formed felt is allowed to pick up a water solution containing 2½% by weight of a tanning agent, such pick-up will bring into contact with the felt an amount of tanning agent equal to about 5% by weight based on the dry weight of fibers. Where a reducing sugar such as dextrose is used, 5% by weight based on the dry weight of the felt has been found to be optimum. In fact, in the practice of the present invention, it has been found preferable to utilize these large amounts of the tanning agent in relation to the amount of protein present. Apparently the mass action law operates to give swifter results than those to be obtained by using smaller and more conventional amounts of tanning agent with regard to the protein involved.

It is difficult, if not impossible, to speak of equivalent weights where tanning agents and protein are concerned. Yet in the practice of the present invention, it has been found that the tanning agent should preferably be present at least in an amount half as much as the weight of the proteinaceous material, and preferably, in many instances, in an amount on a weight basis equal to the weight of the proteinaceous material. This is simply to say that where a felt contains about 5% proteinaceous material, the minimum amount of tanning agent to be used for best results should be around 2–2½% by weight of the felt, while the preferred amount will be up around 5%. To some extent, the precise amount of tanning agent will depend on the tanning agent itself. Where formaldehyde or one of the formaldehyde-yielding substances, such as paraformaldehyde, is utilized, it may be present on a weight basis in an amount equal to about half the weight of the proteinaceous material; that is, formaldehyde exemplifies the excellent tanning agents which may be used in smaller amounts. Where the aldehyde is a reducing sugar, such as dextrose, the tanning action is weaker and a larger amount of the material is preferred in order that the best results may be obtained.

The preferred method of application is to spray or roller coat the felt with a water solution of tanning agent after the felt has been formed on the paper machine but before it passes through the drier section. It has been found that the application is most efficient between the first and second wet presses of the paper machine. At this point the felt has lost most of its interstitial water in the first press and is capable of absorbing additional liquid. In addition, the action of the second press tends to distribute the absorbed liquid containing the tanning agent more evenly throughout the felt.

It is not necessary that the solution containing the tanning agent be applied to the felt in any particular manner. The felt may be immersed in the solution, or the solution may be roller coated onto the felt or sprayed on, as by high pressure nozzles. Although the felt commonly used in the flooring industry picks up a water solution to the extent of about 200% by weight, such pick-up may be decreased if desired simply by squeezing the felt after the solution pick-up or by not roller coating or spraying enough water onto the felt to completely saturate it. Stronger or weaker solutions of tanning agent may be used if desired.

In saturating the felt, it is sometimes desirable that a wetting or dispersing agent be used in order to aid the water solution in penetrating the felt. Any suitable wetting agent may be used so long as the wetting agent is not destroyed by the tanning agent or the tanning agent is not rendered inactive by the wetting agent. Where dextrose is used as the tanning agent, the wetting agent known as Aerosol AY has been found peculiarly suitable.

Once the solution containing the tanning agent has been placed on the felt, the felt may be dried or otherwise treated in the customary manner. It has been shown that the tanning reaction will occur during the drying of the felt. It is unnecessary, however, particularly where a solid tanning agent is used, that this drying action completely tan the proteinaceous material in the felt. This is true because the tanning agent will be present in the felt in the form of a solid powder thoroughly distributed throughout the fibers. Thus, at a later time during the stoving cycle, after the linoleum composition has been calendered onto the surface of the supporting layer, the tanning agent will at that time and under the conditions that exist in the stoves be able to tan the proteinaceous material and thus render impossible the degradation of the protein molecules to produce the volatile nitrogenous-containing, stain-causing reagents. The tanning agent also acts to prevent staining by reacting with any volatile nitrogenous compound that may come off during stoving. This reaction appears to be faster than the staining reaction. Thus, the tanning agents serve a dual role. First, they stabilize proteinaceous material against decomposition; and second, they preferentially react with decomposition products should any form.

In those instances where the protein is not pretanned, it is only required that the tanning agent be in contact with the proteinaceous material during the stoving cycle for the present process to be effective. Therefore, where a solid tanning agent is selected for use, it is possible to distribute the tanning agent on the felt simply by sprinkling the agent thereon. Although this treating method is not the preferred embodiment of the present invention, it may well suffice in those cases where the amount of proteinaceous material in the felt is small. Moisture present during the normal stoving cycle of the linoleum manufacturing process will be adequate to insure reaction between the protein and the tanning agent.

Although very few tanning agents are insoluble in water, those that are insoluble may be applied to the fibers in a beater saturation process or they may be applied to the felt in the form of a suspension or slurry. Alternatively, the desired amounts of insoluble tanning agents may be laid down along with the felt on a wire or cylinder during the usual felt-making procedures.

The end point of any tanning reaction is a difficult thing to define, as mentioned earlier. Although in all likelihood there is no difference between the tanning reaction of the present invention and the tanning reaction in the prior art, such as in leather making, the tanning required in the present invention must be sufficient merely to withstand the conditions that exist in the stoving cycle of linoleum manufacture. Thus it is possible to define the extent of the tanning that takes place in the present invention by limiting the tanning as being sufficient to prevent the degradation of protein into volatile nitrogenous degradation products in the presence of moisture at temperatures up to about 250° F. So long as tanning is carried out to that extent, the stove staining phenomenon will be eliminated.

EXAMPLES

A series of tests were run to demonstrate the efficacy of various tanning agents. The linoleum composition used was prepared from linseed oil:rosin in a weight ratio of 75:25, preoxidized into a cement, then blended with wood flour and whiting in a cement:filler ratio of 35:65. The blended linoleum composition was calendered to a thickness of .050" and cut into circles measuring about 4" in diameter. These linoleum composition discs were white in color in the uncured condition, and a very light cream color after being maintained at a temperature of 195° F. for 6 days, isolated from other materials. Two of these linoleum composition discs were placed on watch glasses in one-gallon paint cans with snap lids, along with three grams of water in a small beaker. Into the can was also placed fibrous materials in the form of felt containing proteinaceous material in treated or untreated form. In each series of runs, there was one control consisting of the two discs in one can which did not contain any proteinaceous material whatsoever. Each series also had another can wherein an untreated felt containing about 5% proteinaceous material was used; this was to show the extent of the staining problem in the port. An arbitrary qualitative staining scale from 0 to 10 was used to describe the extent of staining taking place in any given can. A rating of 0 meant that the disc showed no color change from that shown by the control wherein no felt at all was used; this gave the very light cream color. At the other end of the scale, a rating of 10 indicated the worse possible staining noted; this latter shade was the dark brown color obtained when untreated felt was present in the can.

Although the discs originally were exposed in the sealed cans to the action of the felt containing proteinaceous material at a temperature of 195° F., for a period of 6 days, such a lengthy period was found to be unnecessary. Temperatures maintained at 250° F. for 18–48 hours were the equivalent of the 6-day run at the lower temperature. No observable difference was noted between 18 and 48 hours at the 250° F. temperature. In any case, the temperature used in the individual runs is noted in the following examples:

*Example 1*

In this example, the efficacy of aldehydes as tanning agents to eliminate the stove staining mechanism was explored. A felt made of beater saturated fibers with GR-S was cut into 4" discs and saturated with a 5% solution of glyoxal and dextrose, respectively. Two each of these discs were maintained at a temperature of 195° F. until dry; the time required was 20 minutes. Subsequently, each set of the two discs was placed in a can along with two discs of the test linoleum composition and 3 grams of water. Another can contained untreated felt, the linoleum test discs, and 3 grams of an aqueous solution of about 10% formaldehyde. Still another can contained the linoleum discs, the untreated felt discs, the 3 grams of water, and 0.25 gram paraformaldehyde.

All the cans were placed in an oven maintained at 195° F. and kept there for 6 days. At the end of that time, the cans were removed, cooled, and opened. The linoleum test discs possessed the following shades of staining:

| Shade | Tanning agent |
|---|---|
| 1 | Control |
| 7 | Untreated felt |
| 2 | Formaldehyde |
| 2 | Paraformaldehyde |
| 2 | Glyoxal |
| 1 | Dextrose |

Example II

Flooring felt samples containing 5% proteinaceous material were prepared containing 1%, 2½%, 5%, 7%, and 10% dextrose, respectively. On being tested at 195° F. for 6 days, the following results were obtained:

| Shade | Tanning agent |
|---|---|
| 1 | Control |
| 8 | Untreated felt |
| 7 | 1% dextrose |
| 5 | 2½% dextrose |
| 2 | 5% dextrose |
| 1 | 7% dextrose |
| 1 | 10% dextrose |

The use of fructose gave substantially identical results as with dextrose. Lactose, while showing substantial improvement over the untreated felt, did not give as good results as dextrose and fructose.

Example III

Flooring felt specimens containing 5% proteinaceous material were immersed in a solution of 10% aluminum sulfate and 10% chromium potassium sulfate, respectively, and the solutions were maintained at 60° C. for 45 minutes. After removal and thorough washing, the felts were dried and tested with linoleum test compositions as outlined above. The test discs showed no greater discoloration than the control, thus showing that the metal salts stabilized the proteinaceous material against decomposition at 195° F. for a period of 6 days.

Example IV

Felt fibers were immersed in a 10% solution of alum maintained at 50° C. for one-half hour. Subsequently, the fibers were formed into a felted sheet on a wire, and after through washing, were dried. When this felt was tested in accordance with the test outlined above, no staining occurred.

Example V

5% solutions in water of the following dibasic acids were prepared: oxalic, citric, succinic, maleic, and phthalic. Samples of felt containing 5% proteinaceous material were saturated with the solution; the pick-up of solution was about 200% based on the dry weight of the fibers. After drying at 195° for 20 minutes, samples of the felt containing the various polybasic acids were individually tested for staining. The following results were obtained:

| Shade | Tanning agent |
|---|---|
| 2 | Control |
| 9 | Untreated felt |
| 3 | Oxalic acid |
| 4 | Citric acid |
| 3 | Succinic acid |
| 3 | Maleic acid |
| 5 | Phthalic acid |

When the following acids were placed on felt to the extent of 10% by weight based on the dry weight of the fibers, no improvement in staining over that obtained from the untreated felt was noted: oleic, acetic, adipic, and benzoic.

Example VI

The ion exchange resin designated as IR-120 and comprising the sulfonic acid derivative of polystyrene was deposited in the beater on fibers to the extent of 10% by weight based on the dry weight of the fibers. In the same manner, the purified wood lignin designated as Indulin A was also deposited on the fibers in the beater. Felts prepared from these fibers were dried, cut into circles, and tested in the usual manner. The following table shows the results:

| Shade: | Tanning agent |
|---|---|
| 1 | Control |
| 7 | Untreated felt |
| 0 | Ion exchange resin |
| 2 | Indulin A lignin |

Example VII

A series of syntans were placed on felt to the extent of 10% by weight of the fibers based on dry weights. Following are the results:

| Shade: | Tanning agent |
|---|---|
| 1 | Control |
| 7 | Untreated felt |
| 3 | Leukanol HPS |
| 2 | Leukanol R |
| 1 | Orotan TV |

Example VIII

Felt containing about 5% proteinaceous material was treated to pick up 10% dextrose. The treated felt was then dried at 250° C. for 18 hours in the presence of moisture. It was then thoroughly washed with water to remove all residual dextrose. Identical felt samples were treated exactly the same way except the dextrose was omitted. The following table shows the results:

| Shade: | Tanning agent |
|---|---|
| 1 | Control |
| 7 | Untreated felt |
| 6 | Heated without dextrose |
| 1 | Heated with dextrose |

Example IX

This test was run to illustrate the fact that the presence of tanning agents reduces stove staining by preferentially reacting with volatile nitrogenous degradation products from protein.

Each can contained the usual two pieces of linoleum composition and three grams of water. In addition, the cans other than the controls contained a disc of glass fibers treated with the tanning agents described below, along with two pieces of untreated felt. The treated glass fabric did not come in physical contact with the linoleum or the felt, nor did the felt touch the linoleum. Stoving was carried out at 250° F. for 20 hours.

| Shade: | Tanning agent |
|---|---|
| 1 | Control |
| 9 | Untreated felt |
| 3 | Untreated felt+alum treated glass |
| 4 | Untreated felt+dextrose treated glass |
| 4 | Untreated felt+fructose treated glass |
| 3 | Untreated felt+citric acid treated glass |

Example X

A factory run of 5000 square yards of linoleum was made using a felt containing 5% dextrose. A second run of 6000 yards was made wherein the felt contained 6% dextrose. A light-colored decorative linoleum mix was used as the wear-resistant layer.

After stoving for 14 days at 195° F., both runs were removed from the stoves and inspected. No stove staining was noted as compared with substantially identical runs made without dextrose.

I claim:

1. In the method of making a surface covering which comprises forming a siccative oil linoleum composition-applying said composition to a felted supporting layer containing proteinaceous material as a contaminant therein, and curing said composition at elevated temperature, the improvement which comprises treating said proteinaceous material prior to said curing step with a tanning agent to stabilize reactive nitrogeneous groups thereon.

2. A surface covering comprising a cured decorative wear-resistant layer of siccative oil linoleum composition and a felted supporting layer containing proteinaceous material as a contaminant therein, said proteinaceous material being treated prior to cure with a tanning agent to stabilize reactive nitrogeneous groups thereon.

3. A surface covering comprising a cured decorative wear-resistant layer of siccative oil linoleum composition and a felted flexible supporting layer containing proteinaceous material as a contaminant therein, said proteinaceous material being stabilized prior to cure against deterioration into volatile nitrogenous compounds at temperatures up to about 250° F. in the presence of moisture by treatment with a tanning agent.

4. A surface covering comprising an uncured decorative layer of siccative oil linoleum composition, a flexible felted supporting layer containing proteinaceous material as a contaminant therein, and a tanning agent in said flexible layer.

5. A surface covering comprising a cured decorative wear-resistant layer of siccative oil linoleum composition and a felted supporting layer containing proteinaceous material as a contaminant therein, said proteinaceous material being treated prior to cure with an aldehyde to stabilize reactive nitrogenous groups thereon.

6. A surface covering according to claim 5 wherein said aldehyde is formaldehyde.

7. A surface covering according to claim 5 wherein said aldehyde is paraformaldehyde.

8. A surface covering according to claim 5 wherein said aldehyde is glyoxal.

9. A surface covering according to claim 5 wherein said aldehyde is a reducing sugar.

10. A surface covering according to claim 9 wherein said reducing sugar comprises dextrose.

11. A surface covering according to claim 4 wherein said tanning agent comprises fructose.

12. A surface covering comprising an uncured decorative layer of siccative oil lineoleum composition, a felted flexible supporting layer containing proteinaceous material as a contaminant therein, and a reducing sugar in an amount by weight equal to about the amount by weight of said proteinaceous material.

13. A surface covering according to claim 12 wherein said reducing sugar comprises dextrose.

14. A surface covering according to claim 13 wherein said reducing sugar comprises fructose.

15. A surface covering comprising a cured decorative wear-resistant layer of siccative oil linoleum composition and a felted supporting layer containing proteinaceous material as a contaminant therein, said proteinaceous material being treated prior to cure with a tanning agent comprising a salt of a tanning metal to stabilize reactive nitrogenous groups on said proteinaceous material.

16. A surface covering according to claim 15 wherein said tanning metal is aluminum.

17. A surface covering according to claim 15 wherein said tanning metal is chromium.

18. A surface covering comprising a cured decorative wear-resistant layer of siccative oil linoleum composition and a felted supporting layer containing proteinaceous material as a contaminant therein, said proteinaceous material being treated prior to cure with a tanning agent comprising polybasic organic acids to stabilize reactive nitrogenous groups thereon.

19. A surface covering according to claim 18 wherein said polybasic organic acid comprises oxalic acid.

20. A surface covering according to claim 18 wherein said polybasic organic acid comprises citric acid.

21. A surface covering according to claim 18 wherein said polybasic organic acid comprises succinic acid.

22. A surface according to claim 18 wherein said polybasic organic acid comprises maleic acid.

23. A surface covering according to claim 18 wherein said polybasic organic acid comprises phthalic acid.

24. A surface covering comprising a cured decorative wearer-resistant layer of siccative oil linoleum composition and a felted supporting layer containing proteinaceous material as a contaminant therein, said proteinaceous material being treated prior to cure with a tanning agent comprising a polysulfonic organic acid.

25. A surface covering comprising a cured decorative wear-resistant layer of siccative oil linoleum composition and a felted supporting layer containing proteinaceous material as a contaminant therein, said proteinaceous material being treated prior to cure with a tanning agent comprising syntans to stabilize reactive nitrogenous groups thereon.

26. A surface covering according to claim 25 wherein said syntan comprises an aromatic hydroxy compound.

27. A surface covering according to claim 25 wherein said syntan comprises a naphthalenic compound.

28. In the method of making a surface covering which comprises forming a siccative oil linoleum composition, applying said composition to a felted supporting layer containing proteinaceous material as a contaminant therein, and curing said siccative oil composition on said supporting layer, the improvement which comprises treating said proteinaceous material prior to said curing step with a tanning agent comprising an aldehyde to stabilize reactive nitrogenous groups thereon.

29. In the method of making a surface covering which comprises forming a siccative oil linoleum composition, placing said composition on a felted supporting layer containing proteinaceous material as a contaminant therein, and curing said composition on said supporting layer at an elevated temperature, the improvement which comprises incorporating a reducing sugar in said supporting layer prior to said curing step.

30. The method according to claim 29 wherein said reducing sugar is utilized in an amount by weight at least equal to the weight of said proteinaceous material.

31. The method according to claim 29 wherein said reducing sugar comprises dextrose.

32. The method according to claim 29 wherein said reducing sugar comprises fructose.

33. In the method of making a surface covering which comprises forming a siccative oil linoleum composition, incorporating said composition on a felted supporting layer containing proteinaceous material as a contaminant therein, and curing said composition at an elevated temperature, the improvement which comprises treating said protenaceous material prior to said curing step with a tanning agent comprising a metal salt to stabilize reactive nitrogenous groups in said proteinaceous material.

34. In the method of making a surface covering which comprises forming a decorative wear-resistant layer of siccative oil linoleum composition, calendering said composition onto a felted supporting layer containing proteinaceous material as a contaminant therein, and curing said composition at an elevated temperature, the improvement which comprises treating said proteinaceous material prior to said curing step with a tanning agent comprising a dibasic organic acid to stabilize reactive nitrogenous groups thereon.

35. In the method of making a surface covering which comprises forming a decorative wear-resistant layer of siccative oil linoleum composition, calendering said composition into a felted supporting layer containing proteinaceous material, and curing composition at an elevated temperature, the improvement which comprises treating said proteinaceous material prior to said curing step with a tanning agent comprising a natural tanning to stabilize reactive nitrogenous groups thereon.

36. The method according to claim 33 in which said metal comprises aluminum.

37. The method according to claim 33 in which said metal salt comprises aluminum sulfate.

References Cited in the file of this patent

UNITED STATES PATENTS

| | | |
|---|---|---|
| 632,162 | Wolff | Aug. 29, 1899 |
| 632,723 | Kingscote | Sept. 12, 1899 |
| 704,082 | McKay | July 8, 1902 |
| 795,075 | Steinharter | July 18, 1905 |
| 2,201,891 | Edgar et al. | May 21, 1940 |
| 2,640,752 | Davis et al. | June 2, 1953 |

OTHER REFERENCES

"Progress in Leather Science" (British Leather 1920–1945 Manufacturers' Research Association), pages 505, 527, 519, 674 and 675.

U. S. DEPARTMENT OF COMMERCE
PATENT OFFICE

CERTIFICATE OF CORRECTION

Patent No. 2,819,754 January 14, 1958

David A. Feigley, Jr.

It is hereby certified that error appears in the printed specification of the above numbered patent requiring correction and that the said Letters Patent should read as corrected below.

Column 7, line 62, for "through" read -- thorough --; column 9, line 14, after "composition" strike out the hyphen and insert instead a comma; line 60, for "lineoleum" read -- linoleum --; column 10, line 18, after "surface" insert -- covering --; line 23, for "wearer-resistant" read -- wear-resistant --; column 11, line 12, for "into" read -- onto --; line 13, after "material" insert -- as a contaminant therein --.

Signed and sealed this 4th day of March 1958.

(SEAL)
Attest:
KARL H. AXLINE
Attesting Officer

ROBERT C. WATSON
Commissioner of Patents